US012587904B2

(12) United States Patent     (10) Patent No.:   US 12,587,904 B2
Zhu et al.     (45) Date of Patent:    Mar. 24, 2026

(54) SYSTEM AND METHOD FOR SELECTING NETWORK SLICES BASED ON NETWORK SLICE CONGESTION INFORMATION

(71) Applicant: Verizon Patent and Licensing Inc., Basking Ridge, NJ (US)

(72) Inventors: Lily Zhu, Parsippany, NJ (US); Deepa Jagannatha, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 979 days.

(21) Appl. No.: 17/749,764

(22) Filed: May 20, 2022

(65) Prior Publication Data

US 2023/0379764 A1    Nov. 23, 2023

(51) Int. Cl.
| | |
|---|---|
| *H04W 28/24* | (2009.01) |
| *H04W 28/02* | (2009.01) |
| *H04W 40/02* | (2009.01) |
| *H04W 48/06* | (2009.01) |
| *H04W 48/10* | (2009.01) |
| *G06F 3/0482* | (2013.01) |

(52) U.S. Cl.
CPC ....... *H04W 28/24* (2013.01); *H04W 28/0215* (2013.01); *H04W 40/02* (2013.01); *H04W 48/06* (2013.01); *H04W 48/10* (2013.01); *G06F 3/0482* (2013.01)

(58) Field of Classification Search
CPC . H04W 28/24; H04W 28/0215; H04W 40/02; H04W 48/06; H04W 48/10; G06F 3/0482
See application file for complete search history.

(56) References Cited

U.S. PATENT DOCUMENTS

| | | | | |
|---|---|---|---|---|
| 2020/0120721 A1* | 4/2020 | Lau | ........................ | H04W 76/11 |
| 2021/0029579 A1* | 1/2021 | Tiwari | .................. | H04W 76/38 |
| 2021/0029628 A1* | 1/2021 | Kim | ...................... | H04W 48/18 |
| 2022/0272620 A1* | 8/2022 | Ninglekhu | ............ | H04W 40/02 |

* cited by examiner

*Primary Examiner* — Brian J. Gillis

(57) ABSTRACT

A device includes a memory that stores a User Equipment Route Selection Policy (URSP) and a processor. The processor is configured to: receive a signal broadcast from an access station; obtain network slice congestion information from the signal; apply the URSP to the network slice congestion information to select a network slice; and establish a session with the selected network slice.

20 Claims, 13 Drawing Sheets

NETWORK
104

NETWORK
SLICE
212

URSP
PROCESSOR
108

UE 102

URSP 106

FIG. 4

400

| IE NAME 402 | PRES 404 | RANGE 406 | IE TYPE 408 | CRITICALITY 410 |
|---|---|---|---|---|
| MESSAGE TYPE | M | | | IGNORE |
| AMF OVERLOAD RESPONSE | O | | OVERLOAD RESPONSE | REJECT |
| AMF TRAFFIC LOAD REDUCTION IND. | O | | TRAFFIC LOAD REDUCTION IND. | IGNORE |
| CONGESTION S-NSSAI LIST | | | | IGNORE |
| SLICE CONGESTION LIST | M | | | |
| SLICE CONGESTION RESPONSE | O | | OVERLOAD RESPONSE | |
| SLICE CONGESTION REDUCTION IND. | O | | TRAFFIC LOAD REDUCTION IND. | |

```
1    Array of {
2         Slice IDs = BIT STRING ( SIZE [1 ... 32]
3         Congestion Status = BIT STRING [1 .. 2]
4    }
```

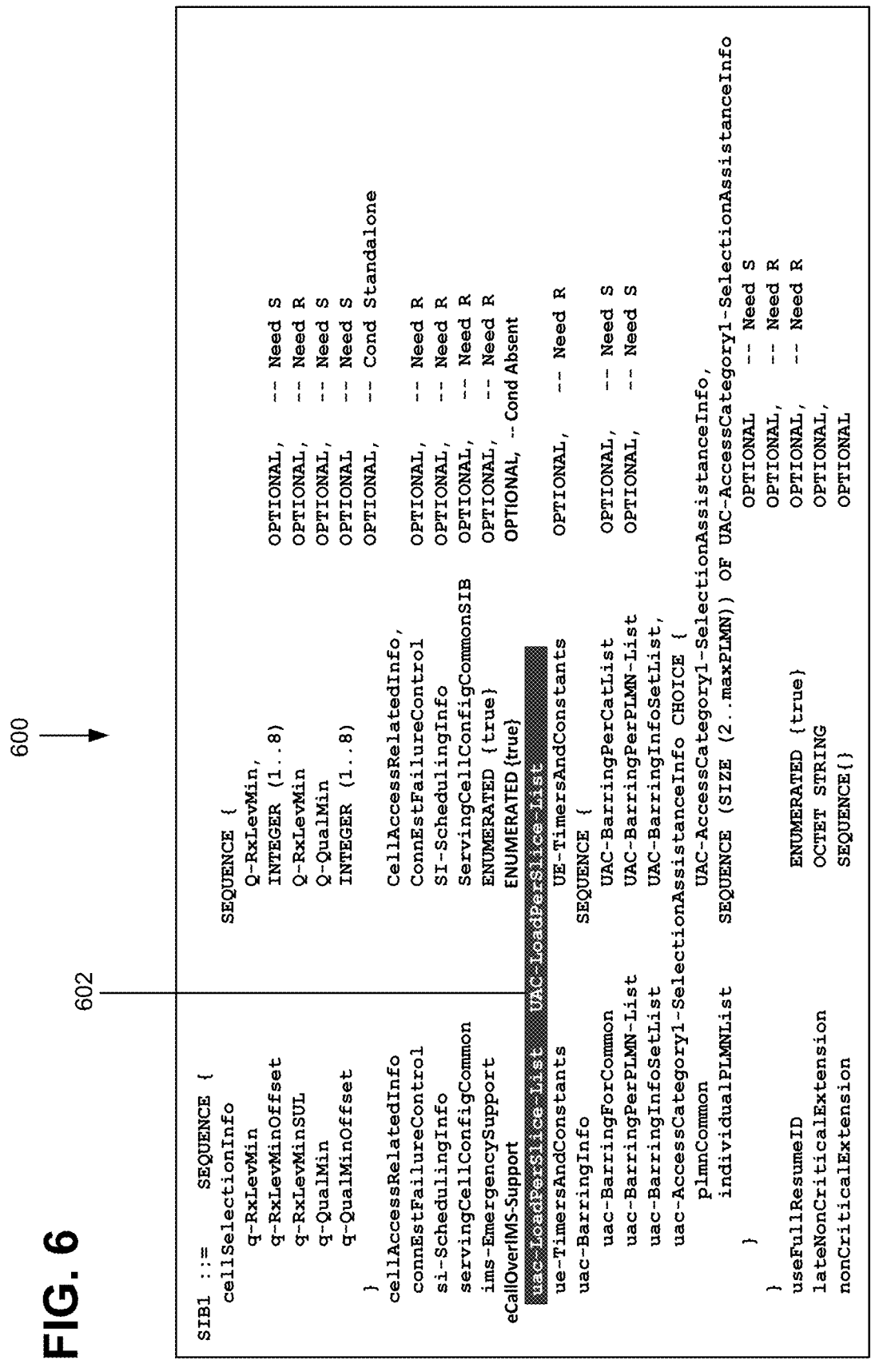

```
SIB1 ::=     SEQUENCE {
cellSelectionInfo           SEQUENCE {
    q-RxLevMin                  Q-RxLevMin,
    q-RxLevMinOffset            INTEGER (1..8)              OPTIONAL,    -- Need S
    q-RxLevMinSUL               Q-RxLevMin                  OPTIONAL,    -- Need R
    q-QualMin                   Q-QualMin                   OPTIONAL,    -- Need S
    q-QualMinOffset             INTEGER (1..8)              OPTIONAL     -- Need S
    }                                                       OPTIONAL,    -- Cond Standalone
cellAccessRelatedInfo       CellAccessRelatedInfo,
connEstFailureControl       ConnEstFailureControl          OPTIONAL,    -- Need R
si-SchedulingInfo           SI-SchedulingInfo              OPTIONAL,    -- Need R
servingCellConfigCommon     ServingCellConfigCommonSIB     OPTIONAL,    -- Need R
ims-EmergencySupport        ENUMERATED {true}              OPTIONAL,    -- Need R
eCallOverIMS-Support        ENUMERATED {true}              OPTIONAL,  --Cond Absent
uac-LoadPerSlice-List       UAC-LoadPerSlice-list
ue-TimersAndConstants       UE-TimersAndConstants          OPTIONAL,    -- Need R
uac-BarringInfo             SEQUENCE {
    uac-BarringForCommon        UAC-BarringPerCatList
    uac-BarringPerPLMN-List     UAC-BarringPerPLMN-List     OPTIONAL,    -- Need S
    uac-BarringInfoSetList      UAC-BarringInfoSetList,                 -- Need S
    uac-AccessCategory1-SelectionAssistanceInfo CHOICE {
        plmnCommon                  UAC-AccessCategory1-SelectionAssistanceInfo,
        individualPLMNList          SEQUENCE (SIZE (2..maxPLMN)) OF UAC-AccessCategory1-SelectionAssistanceInfo
        }                                                   OPTIONAL    -- Need S
    }                                                       OPTIONAL,   -- Need R
useFullResumeID             ENUMERATED {true}              OPTIONAL,    -- Need R
lateNonCriticalExtension    OCTET STRING                   OPTIONAL,
nonCriticalExtension        SEQUENCE{}                     OPTIONAL
}
```

| ROUTE SELECTION DESCRIPTOR PARAMETER | DESCRIPTION |
|---|---|
| SSC MODE SELECTOR 902 | SSC MODE 1, 2, OR 3 |
| NETWORK SLICE SELECTOR 904 | S-NSSAIs |
| DNN SELECTOR 906 | DNN VALUES |
| PDU SESSION TYPE SELECTOR 908 | IP, UNSTRUCTURED, OR ETHERNET |
| NON-SEAMLESS OFFLOAD INDICATION 910 | INDICATES IF THE TRAFFIC IS TO BE OFFLOADED TO NON-3GPP |
| ACCESS TYPE PREFERENCE 912 | 3GPP OR NON-3GPP |
| MULTI-ACCESS PREFERENCE 914 | MULTI-ACCESS OR NON-MULTI-ACCESS |

| PRECEDENCE 1002 | TRAFFIC DESCRIPTOR 1004 | ROUTE SELECTION DESCRIPTOR 1006 |
|---|---|---|
| 1<br>1002-1 | APP ID = STREAMING APP | RSD 1: S-NSSAI-A, ENTERPRISE DNN, 3GPP ACCESS<br><br>RSD 2: ENTERPRISE DNN, 3GPP ACCESS |
| 2<br>1002-2 | APP ID = IMS VOICE APP | RSD 1: IMS DNN, 3GPP ACCESS, SSC MODE 1<br><br>RSD 2: 3GPP ACCESS, IMS DNN |
| 3<br>1002-3 | FQDN ID = VIDEO APP | RSD 1: S-NSSAI-B, PERMITTED (WLAN SSID-A) – NON-SEAMLESS OFFLOAD |
| 4<br>1002-4 | DNN = ADMIN | RSD 1: 3GPP ACCESS |
| 5<br>1002-5 | CONNECTION CAPABILITIES = "IMS" | RSD 1: 3GPP ACCESS, IMS DNN |
| DEFAULT<br>1002-8 | WILD CARD | RSD 1: S-NSSAI-B, INTERNET DNN<br><br>RSD 2: INTERNET DNN |

1300

SYSTEM AND METHOD FOR SELECTING NETWORK SLICES BASED ON NETWORK SLICE CONGESTION INFORMATION

BACKGROUND INFORMATION

Advanced wireless networks incorporate many innovative technological features that may not be present in older networks. For example, a Fifth Generation (5G) network may incorporate network slicing technology to increase network efficiency and performance. In contrast, a Long-Term Evolution (LTE) network may not provide native support for network slicing. As another example, a 5G network may provide mobile devices with the ability to use User Equipment (UE) Route Selection Policy (URSP) rules, to enable the mobile devices to access particular services.

BRIEF DESCRIPTION OF THE DRAWINGS

FIG. 4 illustrates an exemplary information element that a network component may send to or receive from another network component, according to an implementation;

FIG. 5 shows an exemplary format of network slice congestion information, according to an implementation;

FIG. 6 illustrates exemplary network slice congestion information included in a System Information Block 1 broadcast from an access station, according to an embodiment;

FIG. 9 illustrates exemplary route selection descriptors (RSDs), according to an implementation;

FIG. 10 illustrates exemplary rules of a URSP in a tabular format, according to an embodiment;

DETAILED DESCRIPTION OF EXAMPLE EMBODIMENTS

The following detailed description refers to the accompanying drawings. The same reference numbers in different drawings may identify the same or similar elements.

Systems and methods described herein relate to notifications of network slice congestion and selecting network slices based on slice congestion information. When a mobile device connects to a cellular network, the mobile device may attempt to connect to a network slice to receive a particular service (e.g., a Voice-over-IP (VoIP) service, a content streaming service, a computational service, etc.). If the network slice is handling too much traffic and is overburdened, the network slice may not be able to provide the service at a level that meets the requirements of the Service-Level Agreement (SLA) between the user of the mobile device and the provider of the service. The systems and the methods described herein permit the mobile device in such a situation to request a different network slice from the network, enabling the user to access an equal or higher quality level of service from an available network slice providing the same service. That is, the mobile device may search for the service from another slice.

Figure 1:
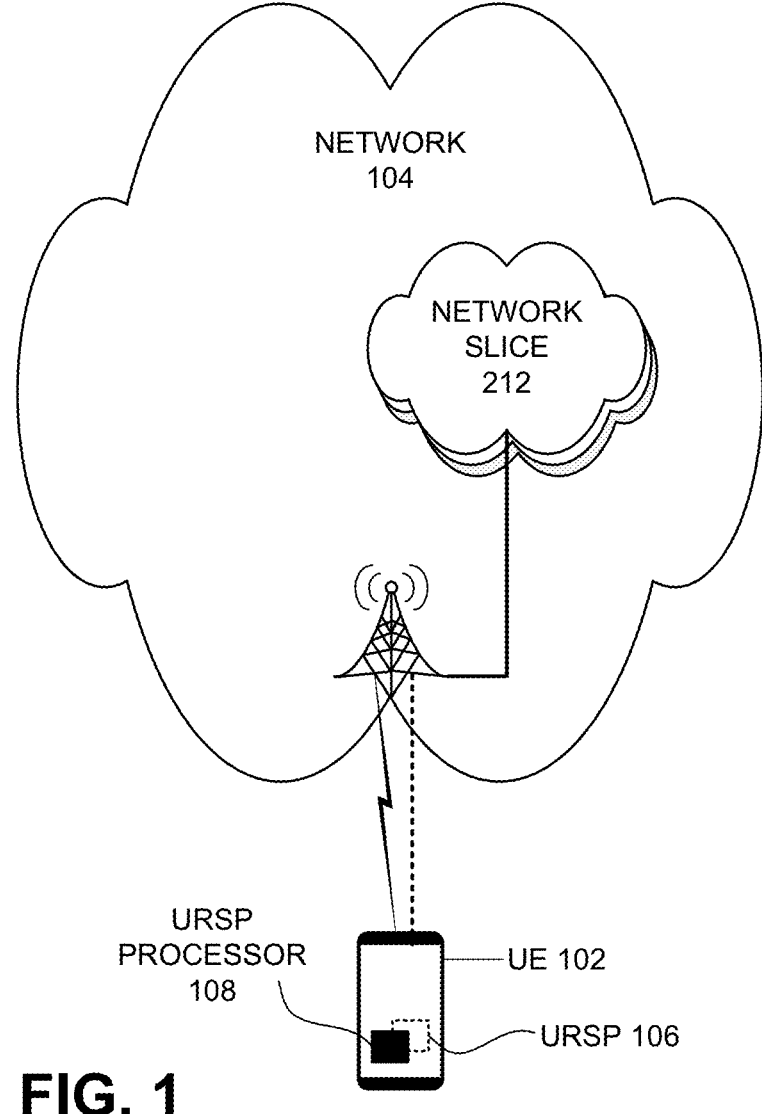
FIG. 1 illustrates concepts described herein.

FIG. 1 illustrates an overview of the concepts described herein. As shown, a network 104 (e.g., a cellular network) is configured to provide communications-related services to a User Equipment device (UE) 102. To enable UE 102 to select a network slice, among network slices 212 based on the network conditions (e.g., congestion, load on particular network slices, topological or geographical distances of UE 102 from each of network slices 212, computational power associated with each network slice 212, etc.), network 104 may forward rules for selecting a particular network slice to UE 102. The rules are herein referred to as User Equipment Route Selection Policy (URSP) rules (also referred to as a URSP). When UE 102 receives the URSP 106 from network 104, UE 102 may store the URSP 106 in in a local storage.

In FIG. 1, network 104 monitors each of the network slices 212 for its congestion states (e.g., moderately contested, highly congested, blocked/jammed, normal, etc.), obtains network slice congestion information (e.g., information that indicates the congestion states of the network slices 212), and broadcasts the network slice congestion information to UE 102. UE 102 stores the information. When UE 102 needs to connect to network 104 to receive a service, a communications interface (e.g., a wireless modem) in UE 102 retrieves the network slice congestion information and provides the information to URSP processor 108 in UE 102. URSP processor 108 may then apply the URSP 106 to select a network slice that can best service mobile device 102. The communication interface may then connect to the selected network slice 212. Depending on the implementation, the selection may be automatic or may be made with input from the user of UE 102. In implementations that permit the user to make a selection, the user may be presented with various options (e.g., price options, incentives, coupons, subscription upgrade options, etc.) before making a selection.

Figure 2:
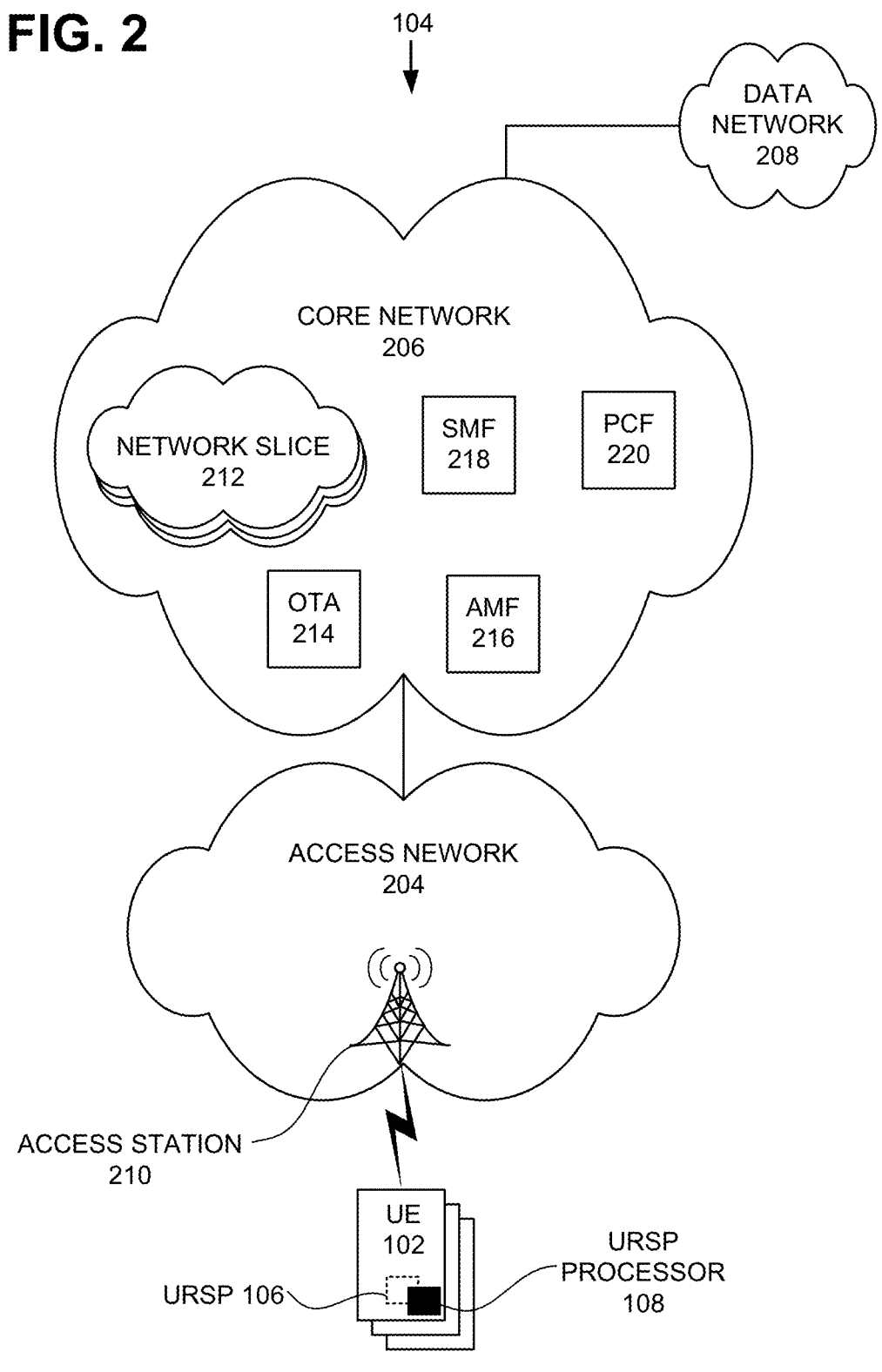
FIG. 2 illustrates an exemplary network environment in which the systems and methods described herein may be implemented.

FIG. 2 illustrates an exemplary network environment in which the systems and methods described herein may be implemented. As shown, the environment may include one or more UEs 102 (generically and individually referred to as UE 102) and network 104. Network 104 may include an access network 204, a core network 206, and a data network 208. Components of the system for selecting a network slice may reside within UEs 102, access network 204, core network 206, and/or data network 208.

UE 102 may include a wireless communication device, a mobile terminal, or a fixed wireless access (FWA) device. Examples of UE 102 include: a smart phone; a tablet device; a wearable computer device (e.g., a smart watch); a laptop computer; an autonomous vehicle with communication capabilities; a portable gaming system; and an Internet-of- Thing (IoT) device. In some implementations, UE 102 may correspond to a wireless Machine-Type-Communication (MTC) device that communicates with other devices over a machine-to-machine (M2M) interface, such as Long-Term-Evolution for Machines (LTE-M) or Category M1 (CAT-M1) devices and Narrow Band (NB)-IoT devices. UE 102 may send packets to or over access network 204.

In one implementation, UE 102 may include a URSP processor 108. URSP processor 108 may be implemented as part of the communication interface (e.g., a wireless modem) of UE 102, another hardware processor, and/or software logic capable of managing URSP 106. For example, when network 104 sends URSP 106 (e.g., over a cellular link, WIFI, etc.), URSP processor 108 may store the URSP 106 in a non-volatile storage (e.g., a particular memory device of UE 102 such as a solid state storage device, a Subscriber Identity Module (SIM), Universal Integrated Circuit Card (UICC), embedded UICC (eUICC), embedded SIM (eSIM), a next generation eUICC, etc.). In addition, when access network 204 broadcasts network slice congestion information to UE 102, UE 102 stores the information in either volatile or non-volatile storage.

When an application on UE 102 requests a connection to network 104, URSP processor 108 retrieves the network slice congestion information. URSP processor 108 then applies the URSP 106 to the network slice congestion information and information that the application passed to URSP processor 108 in the connection request. As a result of applying URSP 106, URSP processor 108 may identify the network slice to which the UE 102 is to connect and then allow UE 102 to connect to the identified network slice. Processing of the network slice congestion information and URSP 106 by UE 102 is described in greater detail with reference to FIGS. 4-10.

Access network 204 may allow UE 102 to connect to core network 206, data network 208, and other devices associated with or included in network 104 (e.g., another UE 102). To do so, access network 204 may establish and maintain, with participation from UE 102, an over-the-air channel with UE 102; and maintain backhaul channels with core network 206. Access network 204 may convey information through these channels, from UE 102 to core network 206 and vice versa.

Access network 204 may include an LTE radio network, a 5G radio network and/or another advanced radio network. These radio networks may operate in many different frequency ranges, including millimeter wave (mmWave) frequencies, sub 6 GHz frequencies, and/or other frequencies. Access network 204 may include many access stations, one of which is shown as access station 210.

Access station 210 may include a 4G, 5G, or another type of access station (e.g., a wireless station, a base station, an evolved Node B (eNB), a next generation Node B (gNB), a Central Unit (CU), a Distributed Unit (DU), a Radio Units (RU), etc.). Some access stations 210 may include Radio Frequency (RF) transceivers for wireless or cellular communication. In some implementations, access station 210 may include Integrated Access and Backhaul (IAB) nodes (not shown). Access station 210 may establish and maintain an over-the-air channel with UE 102 and backhaul channels with core network 206.

In some implementations, to allow UEs 106 to select a particular network slice 212, access station 210 may format and broadcast network slice congestion information. For example, access station 210 may transmit congestion information associated with a set of network slices in a broadcast signal (herein referred to as a System Information Block 1 (SIB1)). The information may include a sequence of identifiers for network slices (e.g., Single-Network Slice Selection Assistance Information and congestion information for the network slices).

Although not shown, access network 204 may include a Multi-Access Edge Computing (MEC) cluster. A MEC cluster may be located geographically close to access stations and, therefore, also be close to UEs 102 serviced by the access station 210. Due to its proximity to UEs 102, the MEC cluster may be capable of providing services to UEs 102 with minimal latency. Depending on the implementations, a MEC cluster may provide many core network functions at network edges. In other implementations, a MEC cluster may be positioned at other locations (e.g., in core network 206) at which the MEC cluster can provide computational resources for improved performance.

Core network 206 may include 4G core network components, 5G core network components, or another type of core network components. Examples of 4G core network components include a Serving Gateway (SGW), a Packet data network Gateway (PGW), and a Mobility Management Entity (MME). Examples of 5G core network components include a User Plane Function (UPF), an Application Function (AF), an Access and Mobility Function (AMF), a Session Management Function (SMF), a Unified Data Management (UDM) function, a Network Slice Selection Function (NSSF), and a Policy Control Function (PCF). Core network 206 may allow the delivery of Internet Protocol (IP) services to UE 102, and may interface with other networks, such as data network 212.

In FIG. 2, core network 206 is shown as including network slices 212, an Over-the-AIR (OTA) server 214, an AMF 216, an SMF 218, and a PCF 220. In different embodiments, however, some of these components 212-220 also may be implemented on access network 204 and/or data network 208. Access network 204, core network 206, and data network 208 may include multiple instances of network slices 212, OTA server 214, AMF 216, SMF 218, PCF 220, and/or other core network components.

Network slices 212 may be instantiated as a result of "network slicing," which involves a form of virtual network architecture that enables multiple logical networks to be implemented on top of a shared physical network infrastructure using software defined networking (SDN) and/or network function virtualization (NFV). Each logical network, referred to as a "network slice," may encompass an end-to-end virtual network with dedicated or shared storage and/or computational resources that include access network components, clouds, transport, Central Processing Unit (CPU) cycles, memory, etc. Furthermore, each network slice 212 may be configured to meet a different set of requirements and be associated with a particular Quality of Service (QoS) class, a type of service, and/or a particular group of customers associated with mobile communication devices and/or fixed wireless access (FWA) devices. Network slices 212 are associated with and may be identified by Network Slice Selection Assistance Information (NSSAI). A single network slice 212 may be identified by a Single-NSSAI (S-NSSAI). Depending on the amount of traffic and/or computational load, a particular network slice 212 may be in one of the following congestion states: a normal state, a moderate congestion state, a high congestion state, or a blocking state. When network slice 212 is in the blocking state, the network slice 212 may no longer accept service requests.

OTA server 214 includes a server for scheduling information to be sent to UE 102 over a wireless link and cause UE 102 to store the information within UE 102. The information may be stored at a particular memory device of UE 102 such as a Subscriber Identity Module (SIM), Universal Integrated Circuit Card (UICC), embedded UICC (eUICC), embedded SIM (eSIM), a next generation eUICC, a Solid State Drive (SSD), etc.

In one embodiment, a network operator or another network component may use OTA server 214 to send an Access Point Name (APN), a URSP 106, a URSP update, etc. OTA server 214 may cause UE 102 to store the APN, the URSP 106, or the update at a SIM, eSIM, eUICC, SSD, etc. In one implementation, OTA server 214 may operate in conjunction with PCF 220 to manage URSP 106 at UE 102 (e.g., store URSP 106, update URSP 106, or remove URSP 106 at UE 102).

AMF 216 may perform registration management, connection management, reachability management, mobility management, lawful intercepts, Short Message Service (SMS) transport between UE 102 and an SMS function, session management message transport between UE 102 and SMF 218, access authentication and authorization, location services management, support of non-3GPP access networks, and/or other types of management processes. AMF 216 may page UE 102 based on mobility category information associated with UE 102 obtained from a Unified Data Management (UDM) function.

AMF 216 may obtain and share network slice congestion information. For example, AMF 216 may receive a message from another network function (NF) about congestion levels at network slices. Alternatively, AMF 216 may monitor the volume of network traffic at each network slice and determine its congestion status based on the monitored volume and the traffic-handling capacity of the network slice. For each network slice 212 or for a set of network slices 212, AMF 216 may send network slice congestion information in a particular format. The formatted information is herein referred to as information elements. Information elements for network slice congestion information may indicate whether a particular network slice in a normal congestion state, a moderate congestion state, a high congestion state, and/or a blocking state.

SMF 218 may: perform session establishment, modification and/or release; perform IP address allocation and management; perform Dynamic Host Configuration Protocol (DHCP) functions; perform selection and control of a UPF; configure traffic steering at a UPF to guide traffic to the correct destination; terminate interfaces toward PCF 220; perform lawful intercepts; charge data collection; support charging interfaces; control and coordinate charging data collection; terminate session management parts of Non-Access Stratum (NAS) messages; perform downlink data notification; manage roaming functionality; and/or perform other types of control plane processes for managing user plane data.

PCF 220 may support policies to control network behavior, provide policy rules to control plane functions (e.g., to an SMF 218), access subscription information relevant to policy decisions, perform policy decisions, and/or perform other types of processes associated with policy enforcement.

In some implementations, PCF 220 may include components for managing URSPs 106. For example, PCF 220 may receive URSP 106 (or an update to URSP 106) from a network operator or another component in core network 206, access network 204, and/or data network 208. PCF 220 may then prepare the URSP 106 for distribution. For example, when PCF 220 receives a URSP 106 from a network component or an operator, PCF 220 may verify or validate the rules (to be described below) within the URSP 106. In some implementations, PCF 220 may assemble rules that apply to network slices 212 as a URSP 106. PCF 220 may schedule, with OTA 214, a URSP 106 to be sent to UEs 102.

Data network 208 may include networks that are external to core network 206. In some implementations, data network 208 may include packet data networks, such as an Internet Protocol (IP) network or another type of network. For example, data network 208 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, an LTE network (e.g., a 4G network), a 5G network, an ad hoc network, a telephone network (e.g., the Public Switched Telephone Network (PSTN), an intranet, or a combination of networks.

For simplicity, FIG. 2 does not show all components that may be included in network 104 (e.g., routers, bridges, wireless access point, additional networks, access stations 210, MEC clusters, etc.). Depending on the implementation, network 104 may include additional, fewer, different, or a different arrangement of components than those illustrated in FIG. 2. Furthermore, in different implementations, the configuration of network 104 may be different.

As indicted above, the systems and methods described herein relate to sending network slice congestion information to UEs 102 and having the UEs 102 select network slices based on the network slice congestion information. Also as indicated above, to enable UEs 102 to use the information, PCF 220 may schedule with OTA server 214 to forward URSP 106 to UEs 102. In other implementations, UE 102 may already have been provisioned with URSP 106. URSP 106 is then stored in UEs 102 (e.g., within non-volatile storage). Thereafter, the system may monitor network slice congestion, prepare and exchange network slice congestion information with one another as IEs, and broadcast the network slice congestion information to UEs 102.

Figure 3:
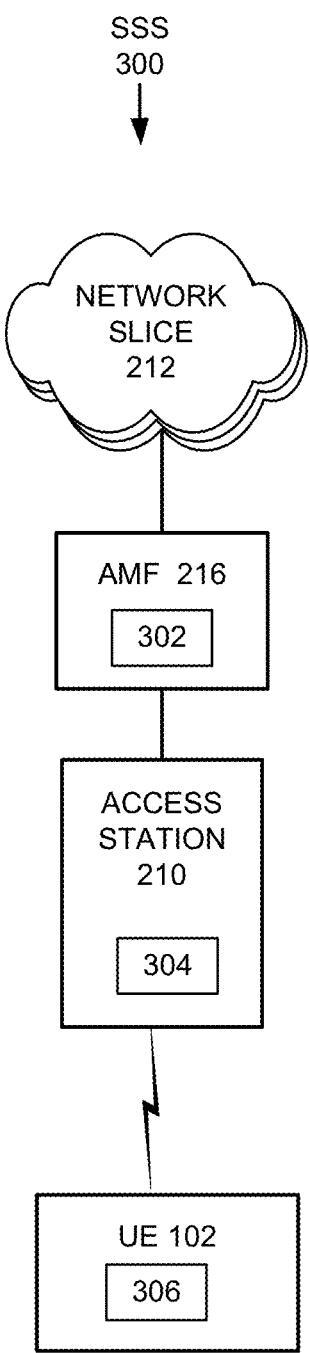
FIG. 3 depicts an exemplary system for notifying of network slice congestion and selecting network slices based on slice congestion information, according to an embodiment.

FIG. 3 illustrates exemplary functional components of the system, herein referred to as Slice Selection System (SSS) 300, according to an embodiment. In the embodiment shown, SSS 300 may include network slices 212, a version of AMF 216, access station 210, and/or UE 102. AMF 216, access station 210, and UE device 102 may include AMF SSS logic 302, Station SSS logic 304, and UE SSS logic 306, respectively.

AMF 216, in addition to performing functions described above, may receive slice-related performance information from network slices 212. The information may include data that indicates operational conditions of network slices 212, such as a congestion condition (i.e., normal, moderately congested, heavily congested, blocked, etc.) and other traffic related parameters, such as a throughput, an average latency/delay, a jitter, etc.

AMF SSS Logic 302 in AMF 216 may process the slice-related performance information, and cause AMF 216 to issue messages to access station 210. Each message may include what are herein referred to as information elements (IEs). The information elements may include network slice congestion information, as explained below with reference to FIG. 4.

Access station 210, in addition to performing functions described above, may receive slice-related IEs from AMF 216. In particular, access station SSS logic 304 may obtain UE-originated traffic-related information for each network slice 212 coupled thereto (e.g., slice traffic, throughput, latency, etc.) based on CU resources consumed for each slice due to the traffic, and together with the received IEs from AMF 216. Access station SSS logic 304 may determine and generate appropriate slice congestion information that access station 210 is to broadcast to UEs 102. Access station SSS logic 304 then incorporates the network slice congestion information as part of a System Information Block 1 (SIB 1). Access station 210 broadcasts SIBs (including SIB1) and a Master Information Block (MIB), as Minimum System Information (MSI) to UEs 102 in the cell.

UE SSS logic 306 may be included in a URSP processor 108. When UE 102 receives a broadcast, logic 306 in UE device 102 detects the network slice congestion information broadcast from access station 210 as part of a SIB message (e.g., SIB 1) and caches the information. Subsequently, when an application in UE 102 requests UE 102 to connect to a network slice 212 in network 104, URSP processor 108 may retrieve the network slice congestion information and apply the URSP 106 in the non-volatile storage of UE 102 to information provided by the application and to the network slice congestion information, to select a network slice 212 to which is UE 102 is to connect. In some implementations, URSP processor 108 (or logic 306) may present the user of UE 102 with different options (e.g., provide a list of network slices 212 to select from, show a list of network slices that offer a higher QoS, an opportunity to provide a coupon, etc.).

Although in FIG. 3, logic 304 is illustrated as being part of access station 210, in other implementations, logic 304 may be implemented as a standalone software/hardware component that is external to access station 210. In addition, in some implementations, UE device 102 may or may not include logic 306. That is, SSS 300 may include additional, fewer, different, or a different arrangement of logical components than those (e.g., logic 302-306) illustrated in FIG. 3.

In the above, logic 302 in AMF 216 may send messages that include information elements (IEs) to access station 210. FIG. 4 illustrates a table 400 of an exemplary implementation of IEs that AMF 216 may include in messages that AMF 216 sends to access station 210. Table 400 indicates, for each IE listed, a number of characteristics of the IE. In particular, for each IE, table 400 shows its name 402, presence information 404, range 406, IE type 408, and assigned criticality 410. IE name 402 indicates the name associated with the IE; Presence 404 indicates whether the information element must be included (M for mandatory or O for optional); Range 406 indicates a number of the information element that may be included in the message. IE type 408 indicates the type of information element—the information element may be one of many defined IE types. Assigned criticality 410 indicates how a recipient of the IE may respond to the information element when it is unable to appropriately interpret or parse the information element.

As shown, table 400 lists the following information elements: Message Type IE, AMF Overload Response IE, AMF Traffic Overload Reduction Indication IE, Load Status S-NSSAI list IE, Slice Load Status IE, Slice Load Response IE, and Slice Load Reduction Indicator IE. Depending on the implementation, AMF 216 may send messages that include additional, fewer, and/or different IEs than those shown in table 400.

Message Type IE indicates the type of message. AMF Overload Response IE indicates the required response by the RAN node (e.g., access station 2) to the overload condition. AMF Traffic Overload Reduction Indication IE specifies the percentage of the type of traffic relative to the instantaneous incoming rate at the RAN node, as indicated at another IE, to be dropped or rejected. Congestion S-NSSAI List IE lists S-NSSAIs for network slices and indicates that congestion conditions for the slices identified by the list of S-NSSAIs are provided.

Slice Congestion list IE may provide S-NSSAI which identifies the congested slice. Slice Congestion Response IE indicates the required response by the RAN node for the congested slice. Slice Congestion Reduction Indication IE specifies the percentage of the type of traffic relative to the instantaneous incoming rate at the RAN node that is to be rejected or dropped. One possible value is 100% drop or blocking.

As discussed above, when access station 210 receives, from AMF 216, messages that include slice-related IEs, after evaluating the AMF 216 overload conditions based on the IEs and traffic data/information which the access station 210 obtains locally, the access station 210 may determine and generate appropriate format for the network slice congestion information (provided by the IEs) to be broadcast to the cell, as part of the SIB. FIG. 5 illustrates an exemplary format for broadcasting the network slice congestion information to be included in an exemplary SIB. FIG. 6 illustrates the slice congestion status information in an example SIB 1. Referring to FIG. 5, in the format 500, the network slice congestion information includes an array of data pairs, each of which includes a slice identifier (ID) and a congestion status. A slice ID may include an S-NSSAI, which is 32-bit long string. A congestion status may include a 2-bit string. The 2-bit string may indicate one of the following: normal (bit values=00 indicating a normal amount of traffic at the network slice 212), moderately congestion (bit values=01 to indicate a moderate congestion at the network slice 212), heavily congested (bit values=10 to indicate a heavy congestion at the network slice), and blocked (bit values=11 to indicate a blocked state of the network slice 212). The blocking bit values may indicate that service requests to the network slice identified by the S-NSSAI are rejected.

In FIG. 6, the network slice congestion information 500 is shown as item 602 within SIB 1 600, as "uac-Load-PerSliceList." The details of the slice congestion information 600 is not shown. When UE 102 receives SIB1, URSP processor 108 on UE 102 may extract the network slice congestion information 500 and stores the information either in its non-volatile storage or dynamic memory.

The information elements illustrated in FIG. 4 and the network slice congestion information illustrated in FIGS. 5 and 6 are exemplary. Depending on the implementation, information element 400 and slice congestion status may include additional, fewer, different, or different information than those illustrated in FIGS. 4, 5, and 6.

Figure 7:
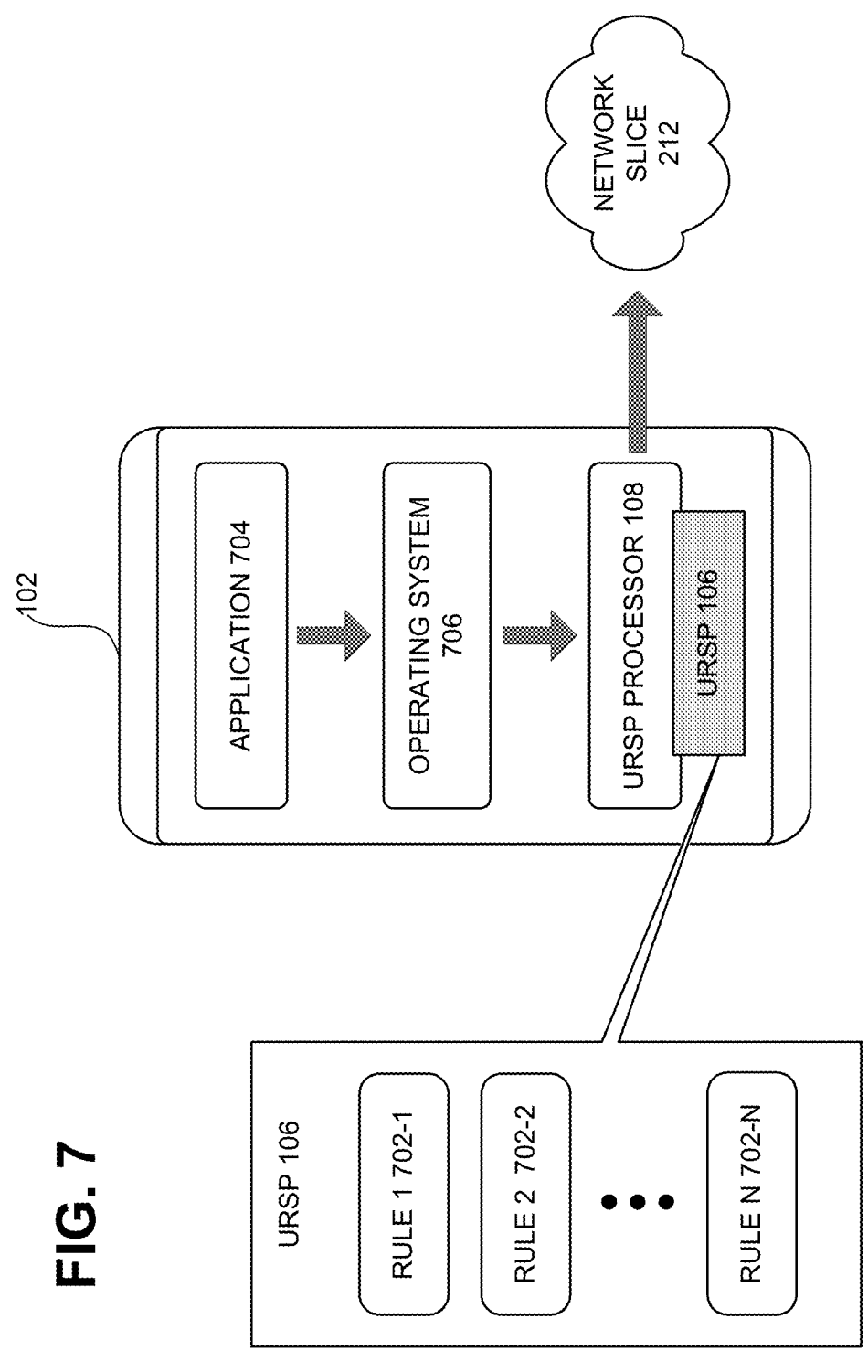
FIG. 7 illustrates exemplary processing of User Equipment Route Selection Policy rules (URSP) by a User Equipment device (UE), according to an embodiment.

After UE 102 obtains network slice congestion information, UE 102 may use the information when applying URSP 106 to select a network slice 212 for an application (which is running on UE 102) requesting a service/session from network 104. FIG. 7 illustrates a UE 102 applying URSP 106 to select a network slice. Assume that UE 102 has received URSP 106 from network 104 (e.g., from OTA server 214) and has stored the URSP 106 in a local storage. As shown, an application 704 installed in UE 102 sends a request via an Operating System (OS) 706 to URSP processor 108 (which may be installed within a modem in UE 102) to establish a session with a server application in one of network slices 212. To establish the session, URSP processor 108 retrieves or obtains the network slice congestion information, an application ID, an OS ID, and/or other parameters that URSP processor 108 may use for applying URSP 106. URSP processor 108 retrieves the URSP 106 from a memory (e.g., a SIM, UICC, etc.).

As shown, URSP 106 includes a series of rules 702 that are arranged in the order of their precedence. For each rule 702, URSP processor 108 matches various parameters specified by the rule 702 to the set of parameters provided by the application and/or obtained by UE 102 locally (e.g., the OS, components in the communication layers of UE 102, etc. and the network slice congestion information, etc.). If a rule 702 matches the parameters, URSP processor 108 selects the rule 702, and then, using the rule, selects (or identifies) the network slice 212 for connecting to application 704. Next, URSP processor 108 establishes the session using the parameters. URSP processor 108 returns one or more of the session parameters to the application 704 or to other components in the communication layers of UE 102, to permit the application 704 to communicate with the selected network slice 212. For example, URSP processor 108 may use an API (e.g., a callback API for the application 704) to indicate the level of congestion at the selected slice or to indicate the processing capability of the network slice. In response, the application 704 may adjust its behavior (e.g., change its mode from a low-data exchange mode to a high data rate exchange mode).

Depending on the implementation, when URSP processor 108 is about to select a network slice 212 based on parameters, USRP processor 108 may cause UE 102 to behave in one of many ways. For example, in some implementations, UE 102 may present the user of UE 102 with various options that are associated with selecting a particular network slice (e.g., price plan options, incentives, coupons, subscription upgrade options, etc.). In other implementations, UE 102 may select the network slice 212 without user input.

Figure 8:
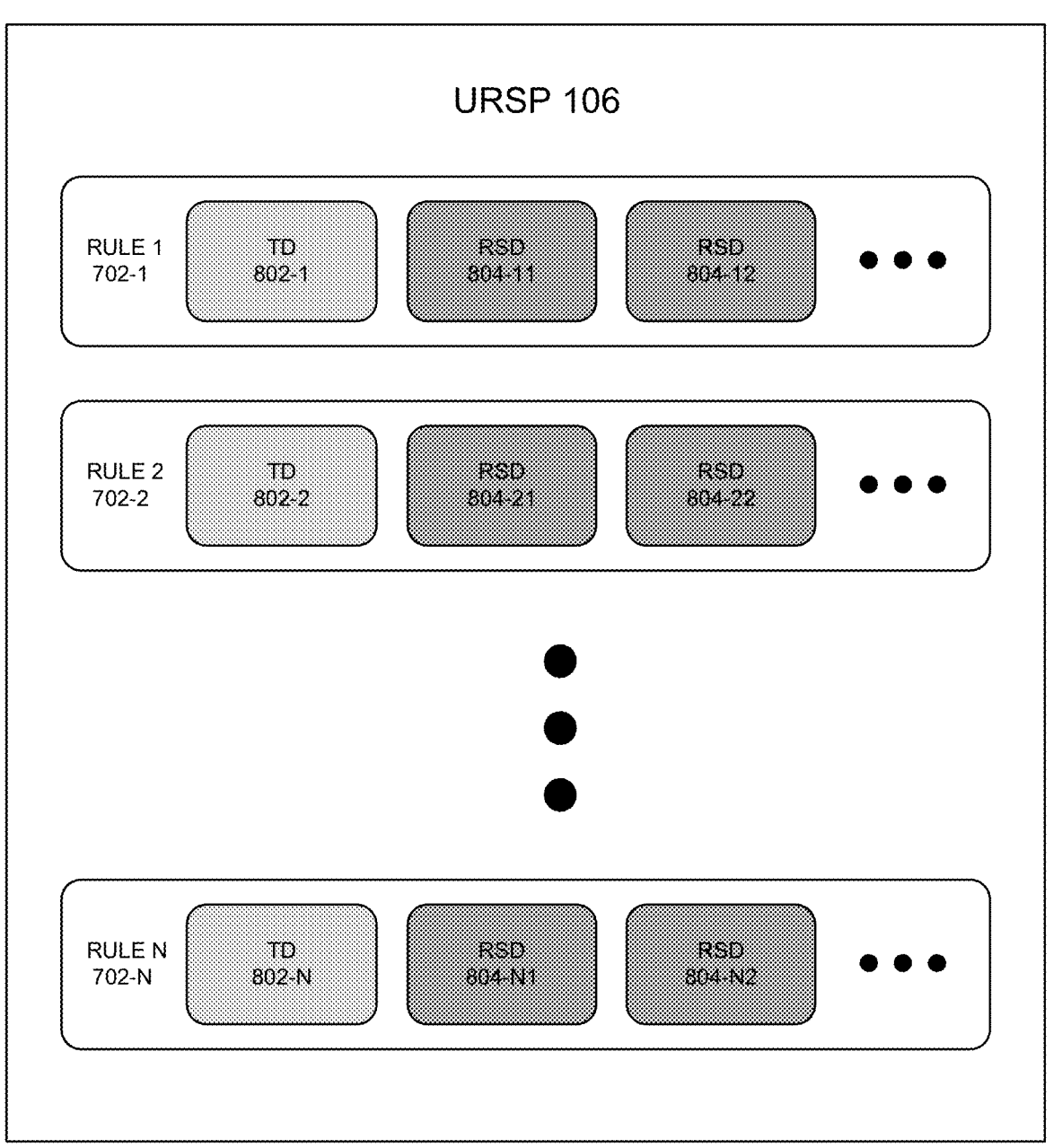
FIG. 8 illustrates exemplary components of a URSP, according to an implementation.

FIG. 8 shows components of URSP 106. As shown, URSP 106 includes a series of rules 702-1 through 702-N, arranged in the order of their precedence. Thus, for example, UE 102 may attempt to evaluate rule 702-1 before attempting to evaluate rule 702-2, rule 702-2 before rule 702-3, and so on. After a matching rule is found, UE 102 would evaluate the remaining rules 702, except the default rule. Each rule 702 is associated with a precedence value, such that the highest precedence is associated with the lowest precedence value (i.e., a higher value indicates lower priority). The last rule 702-N is the default rule.

As further shown, rule 702-1 may include a traffic descriptor (TD) 802-1 and a series of RSDs (route selection descriptors) 804-11 through 804-1M (not shown). Other rules 702-2 through 702-N may also include TDs 802 and RSDs 804, arranged in a manner similar to rule 702-1. Each instance of TD 802-1, 802-2 . . . 802-N (herein collectively referred to as TDs 802 and generically referred to as TD 802) may be different or same as another TD 802. Each TD 802 may specify a parameter that characterizes or defines a particular type of traffic. Each instance of RSD 804 may be different or same as another RSD 804. Each RSD 804 may provide a set of parameters to match. Some RSDs 804 may be directed to network slices and such RSDs may identify one or more network slices 212. Thus, for example, if parameters for an RSD 804 match parameters associated with a particular session requested by application 704, URSP 106 may select the network slice 212 specified by the RSD 804.

FIG. 9 shows a table 900 of parameters for RSDs 804. As shown, RSD 804 may include one or more of the following parameters: a Session Service Continuity (SSC) Mode selector 902, a Network Slice selector 904, a Data Network Name (DNN) selector 906, a PDU Session Type selector 908, a Non-seamless Offload Indication 910, an Access Type Preference 912, and a Multi-Access Preference 914.

SSC Mode selector 902 may indicate an SSC mode. SSC Mode selector 902 may specify one of three values: SSC Mode 1, SSC Mode 2, or SSC Mode 3. SSC Mode 1 indicates continuity of a session when UE 102 moves—all of the session parameters are maintained. SSC Mode 2 indicates that the network may break the connection to UE 102 before making a new connection. SSC Mode 3 indicates that a new connection is made to UE 102 before breaking the earlier connection to maintain the service.

Network Slice selector 904 identifies a network slice and may include an S-NSSAI. DNN selector 706 identifies a data network associated with the connection or service. PDU Session Type selector 908 indicates the type of session to be established or identified. UE 102 may interpret PDU Session Type selector parameter as one of the following: IP, unstructured, or Ethernet. Offload Indication 910 may indicate if the traffic is to be offloaded to a non-3GPP network. Access Type Preference 912 indicates whether the network access is 3GPP or non-3GPP. Multi-Access Preference 914 indicates whether the preferred mode of access for UE 102 is Multi-access or non-Multi-Access for UE 102.

Depending on the implementation, enhanced RSDs 804 may include additional, fewer, or different parameters than those illustrated in table 900 of FIG. 9. For example, in some implementations, RSDs 804 may include an Ignore-RSD selector. When an RSD 804 includes an Ignore-RSD selector parameter, which also specifies a condition in which the Ignore-RSD selector applies, the RSD is to be considered inapplicable. UE 102 may continue evaluating the next lower precedence RSD 804 if there are additional RSDs in the rule. An example of Ignore-RSD parameter value is "IGNORE DNN." When UE 102 detects the Ignore-RSD, URSP processor 108 may stop processing the RSD 804 (i.e., stops evaluating other selectors in the RSD 804).

FIG. 10 illustrates an exemplary URSP 1000 associated with examples of UE 102 processing rules 702 in URSP 106. As shown, URSP 1000 includes rules 1002-1 through 1002-8, organized in the order of their precedence values. Rule 1002-1 has the highest precedence and has the lowest precedence value of 1. Rule 1002-8 is the default rule with the lowest precedent but is deemed to have the highest precedence value (not shown). Each of rules 1002 may include TDs 1004 and RSDs 1006. When UE 102 attempts to establish a session using URSP 1000, UE 102 begins with rule 1002-1 and proceeds to other rules, until a matching rule 1002 is found. If no matching rule is found, the default rule is evaluated and applied. In the following, examples of UE 102 processing a particular rule 1002 are described. Assume for each of the following examples that the TD parameters for the rule 1002 match the session requirements.

Rule 1002-1 includes a TD of APP ID. The APP ID is set to STREAMING APP. Rule 1002-1 also comprises RSD 1 and RSD 2. As shown, RSD 1 includes: Network Slice selector 904 with the value of S-NSSAI-A, DNN selector 906 with the value of ENTERPRISE DNN, and Access Type Preference 912 with the value of 3GPP ACCESS. RSD 2 of rule 1002-1 includes: DNN selector 906 with the value of ENTERPRISE DNN and Access Type Preference 912 with the value of 3GPP ACCESS. During UE 102's evaluation of rule 1002-1, when UE 102 scans RSD 1 and RSD 2, UE 102 determines that all of the parameters in RSD 1 and RSD 2 are applicable to the session. Accordingly, UE 102 applies both RSD 1 and RSD 2.

Rule 1002-2 includes a TD of APP ID. The APP ID is set to IMS VOICE APP. Rule 1002-2 also comprises RSD 1 and RSD 2. RSD 1 includes: SSC Mode selector 704 with the value of SSC Mode 1. For rule 1002-2, UE 102 determines that the parameters of RSD 1 are applicable to the session and accordingly applies the parameters of RSD 1 to the session.

Rule 1002-3 includes a TD of a FQDN, UE 102 evaluates RSD 1. UE 102 would recognize Network Slice selector 904 with the value of S-NSSAI-B. As for rules 1002-4 and 1002-5, UE 102 would evaluate RSD 1. With respect to default rule 1000-6, UE 102 evaluates RSD 1 and RSD 2.

Figure 11:
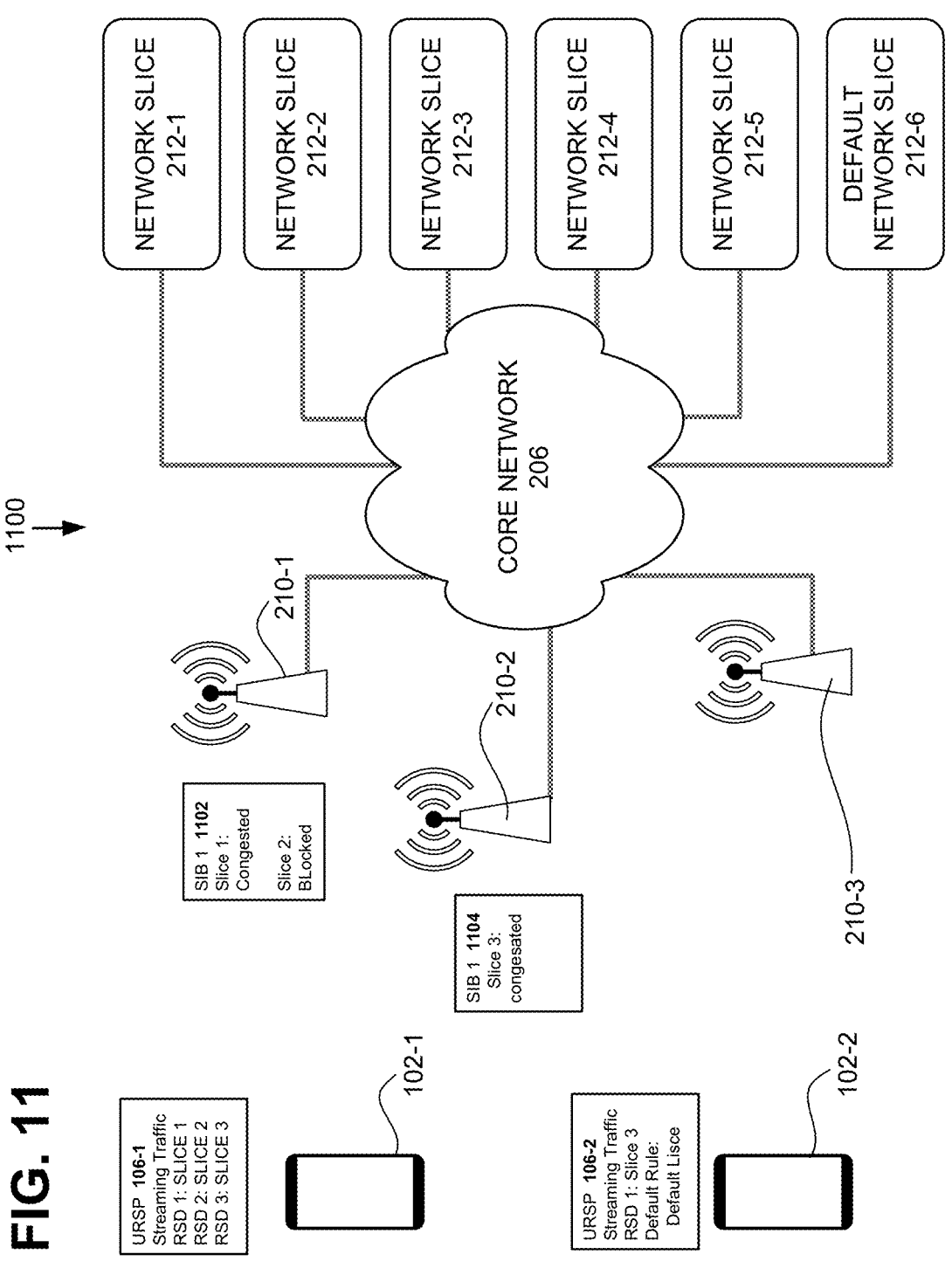
FIG. 11 illustrates exemplary use-case scenarios for a system for notifying of network slice congestion and selecting network slices based on network slice congestion information.

FIG. 11 depicts exemplary use case scenarios for the systems and methods described herein. As shown, scenarios 1100 includes two UEs 102-1 and 102-2, access stations 210-1, 210-2, and 210-3, core network 206, and network slices 212-1 through 212-6. Assume that when UE 102 attempts to connect to a service via access station 210-1, application 704 on UE 102 would be directed to connect to either network slice 212-1, network slice 212-2, or default slice 212-6. If UE 102 attempts to connect to a service via access station 210-2, application 704 would be directed to connect to either network slice 212-3, network slice 212-4, or default slice 212-6. If UE 102 attempts to connect via access station 210-3, application 704 would be directed to connect to either network slice 212-5 or default slice 212-6. Furthermore, assume that, as shown, access station 210-1 is broadcasting SIB 1 1102, which indicates that network slice 212-1 is congested and network slice 212-2 is blocked; and access station 210-2 is broadcasting SIB 1 1104, which indicates that network slice 212-3 is congested. When UE 102-1 and/or UE 102-2 receives the broadcast signal SIB 1 1102 and/or SIB 2 1104 from access stations 210-1 and/or 210-2, UE 102-1 extracts network slice congestion information from SIB 1 1102 for network slice 212-1 (which is congested), network slice 212-2 (which is blocked) and network slice 212-3 (which is congested).

In a use case scenario that involves UE 102-1, subsequent to the storage of the network slice congestion information. UE 102-1 is in the cell managed by access station 210-1. When an application 704 on UE 102-1 signals to the communication interface on UE 102-1 to connect to a service, URSP processor 108 in UE 102-1 retrieves URSP 106-1 and uses the network congestion information to apply URSP 106-1. As shown, URSP 106-1 shows a rule having a TD with the value of Streaming traffic. The rule also comprises the RSD 1, the RSD 2, and the RSD 3 for different network slices. URSP processor 108 knows that the network slice congestion levels for network slices 212-1 and 212-2 are "congested" and "blocked," respectively, and therefore, selects network slice 212-1 for applying the RSD 1, RSD 2, and RSD 3. In this scenario, URSP processor 108 avails only network slice 212-1 for use in matching the RSDs. The only RSD that matches the parameters is RSD 1, which identifies network slice 212-1. Accordingly, URSP processor 108 selects network slice 212-1 to connect to and receive a service therefrom.

In another use-case scenario which involves IE 102-2, subsequent to the storage of the network slice congestion information, when UE 102-2 is in the cell managed by access station 210-2, an application 704 on UE 102-2 signals to the communication interface on UE 102-2 to connect to a service. URSP processor 108 in UE 102-2 retrieves URSP 106-2 and uses the network congestion information to apply URSP 106-2. As shown, URSP 106-2 indicates a TD with the value of Streaming traffic, a rule that comprises the RSD 1, and a default rule. URSP processor 108 knows that the network slice congestion levels/state for network slice 212-3 is "congested." Therefore, URSP processor 108 selects default network slice 212-6 as a result of applying the default rule. The only RSD that matches the default network slice is in the default rule with the S-NSSAI for default network slice 212-6. Accordingly, URSP processor 108 identifies network slice 212-6 in accordance with the default rule to connect to and receive its service therefrom.

Figure 12:
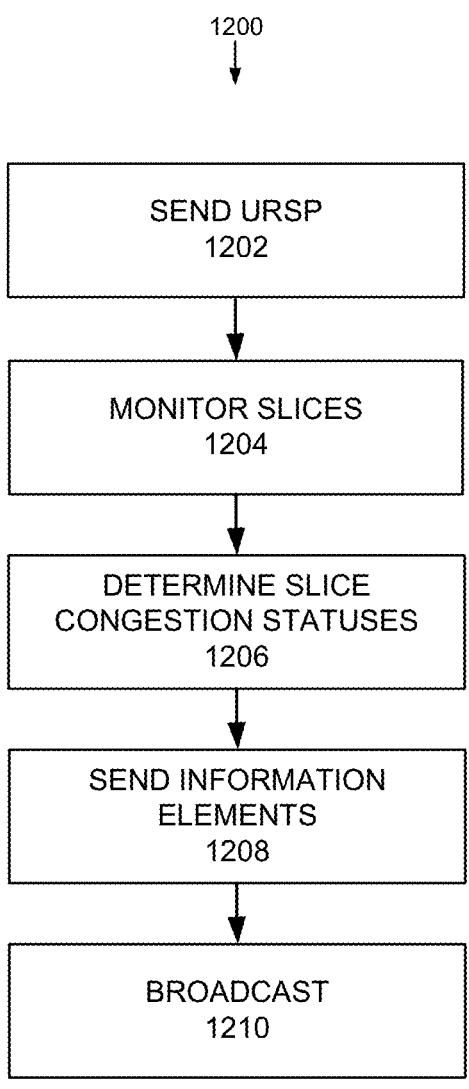
FIG. 12 is a flow diagram of an exemplary process that is associated with notifying of network slice congestion, according to an implementation.

FIG. 12 is a flow diagram of an exemplary process 1200 that is associated with notifying of network slice congestion according to an embodiment. Process 1200 may be performed components of network 104 (e.g., access network 204, core network 206, data network 208, etc.) or by UE 102 in combination with one or more components in network 104. As shown, process 1200 may include, sending a URSP 106 to UE 102. For example, a network function or an administrator may schedule a download of URSP 106 to UEs 102 with OTA server 214. OTA server 214 may send a URSP 106 to UE 102 (block 1202). In another example, PCF 220 in core network 206 may detect an update in URSP 106 and schedule a download of the updated URSP 106 to UEs 102.

Process 1200 may further include one or more network components monitoring network slices 212 (block 1204). For example, AMF 216 may monitor, for each network slice, the traffic. Based on the monitored network slice traffic, the network components may determine, for each of the monitored network slices, a congestion status (block 1206). For example, AMF 216 may compare the traffic at a network slice 212 to various threshold values, to categorize the level of traffic as "normal," "moderately congested," or "heavily congested." If the network does not permit traffic to pass to the network slice 212 (e.g., the network slice 212 is too heavily contested or not functioning) and traffic to the network slice 212 is blocked, AMF 216 may categorize the network slice congestion status as "blocked." Network components that monitor network slice traffic may store the identified congestion status for each slice, until the components update the congestion statuses.

Process 1200 may further include one or more network components creating IEs based on the network congestion status and sending them to other network components (block 1208). For example, AMF 216 may generate IEs that convey network slice congestion information (such as congestion statuses) and forward the IEs to access stations 210. In response to receipt of the IEs, access station 210 may extract the network slice congestion information, insert the network congestion information in a SIB 1, and broadcast the SIB 1 and the network slice congestion information (block 1210). When UE 102 receives the broadcast, UE 102 may extract the network slice congestion information from SIB 1 and store the information for late ruse.

Figure 13:
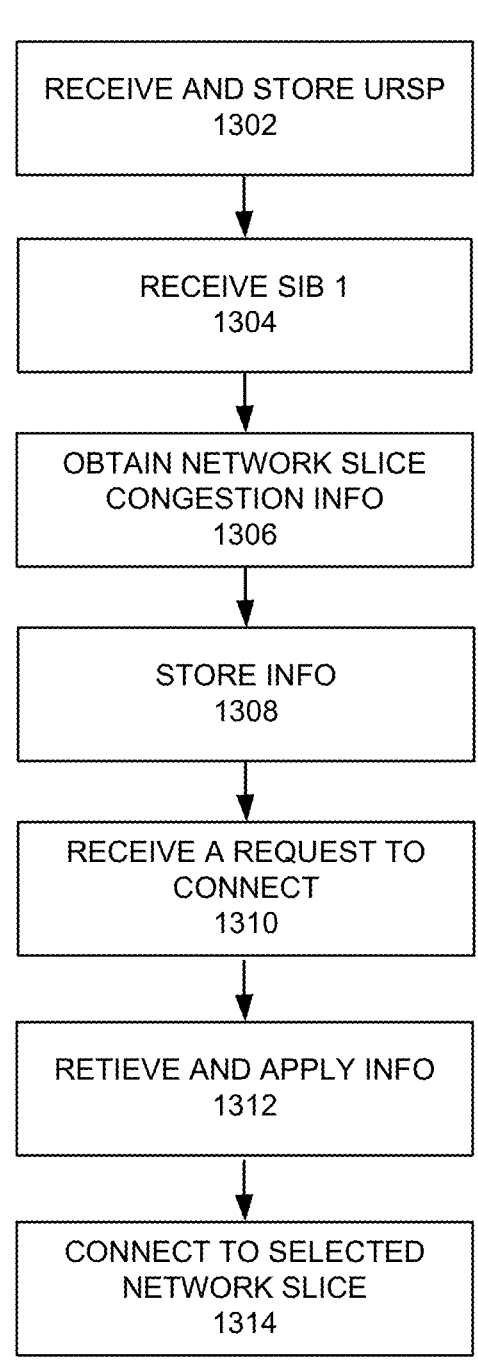
FIG. 13 is a flow diagram of an exemplary process that is associated with receiving network slice congestion information and selecting network slices based on network slice congestion information, according to an implementation.

FIG. 13 is a flow diagram of an exemplary process 1300 that is associated with the methods for receiving network slice congestion information and selecting network slices based on the network slice congestion information, according to an embodiment. Process 1300 may be performed components of network 104 (e.g., access network 204, core network 206, data network 208, etc.) or by UE 102 in combination with one or more components in network 104. As shown, process 1300 may include UE 102 receiving URSP 106 and storing the URSP 106 (block 1302). For example, OTA server 214 in network 104 may send URSP 106 to UE 102, which may then receive the URSP 106 and store the URSP 106 in its local storage.

Process 1300 may further include UE 102 receiving broadcast signals, which include SIB 1 from access station 210 (block 1304). When a communication interface (e.g., a modem) in UE 102 receives SIB 1, the URSP processor 108 coupled to or within the interface may extract or obtain the network slice congestion information from SIB 1 (block 1306) and store the information (block 1308).

After the receipt of the information, an application 704 in UE 102 may cause UE 102 to connect to network 104. To do so, application 704 may make an operating system call, via which application 704 passes a number of parameters (including an application ID and/or other information for determining a TD). That is, the communication interface may receive, from the operating system, a request to connect to network 104 (block 1310). The request may include parameters that application 704 passed to the operating system.

In response to the request, the communication interface may call URSP processor 108. URSP processor 108 may retrieve URSP 106 and the network slice congestion information stored in a local storage of UE 102 and apply URSP 106 to the parameters passed from the operating system and the network congestion information (block 1312). When applying URSP 106 to the parameters, URSP processor 108 may use the network slice congestion information to identify network slices that are available and then use rules 702 where the TDs and RSDs match the parameters and the S-NSSAIs of the identified network slices 212. For example, if the network slice congestion information indicates that two network slices are not congested (e.g., normal), then URSP processor 108 may use the S-NSSAIs of the network slices 212 to match the RSDs. As a result of the matching, URSP processor 108 may identify core more network slices 212 to which application 704 may connect (block 1314).

Depending on the implementation, the communication interface may or may not select the best performing network slice. For example, in one implementation, UE 102 may present various options to the user of UE 102 (e.g., present an opportunity to apply a digital coupon, an opportunity to upgrade its subscription to be provided with a higher QoS service, etc.). Based on the user selection, UE 102 may communicate with various components in network 104 to modify charges, billing information, subscription information, etc. and then connect to the network slice specified by the user selection. In another example, the communication interface may automatically select one of the network slices, provided the subscription of the user permits the user to access the network slice (e.g., in accordance with an SLA).

Figure 14:
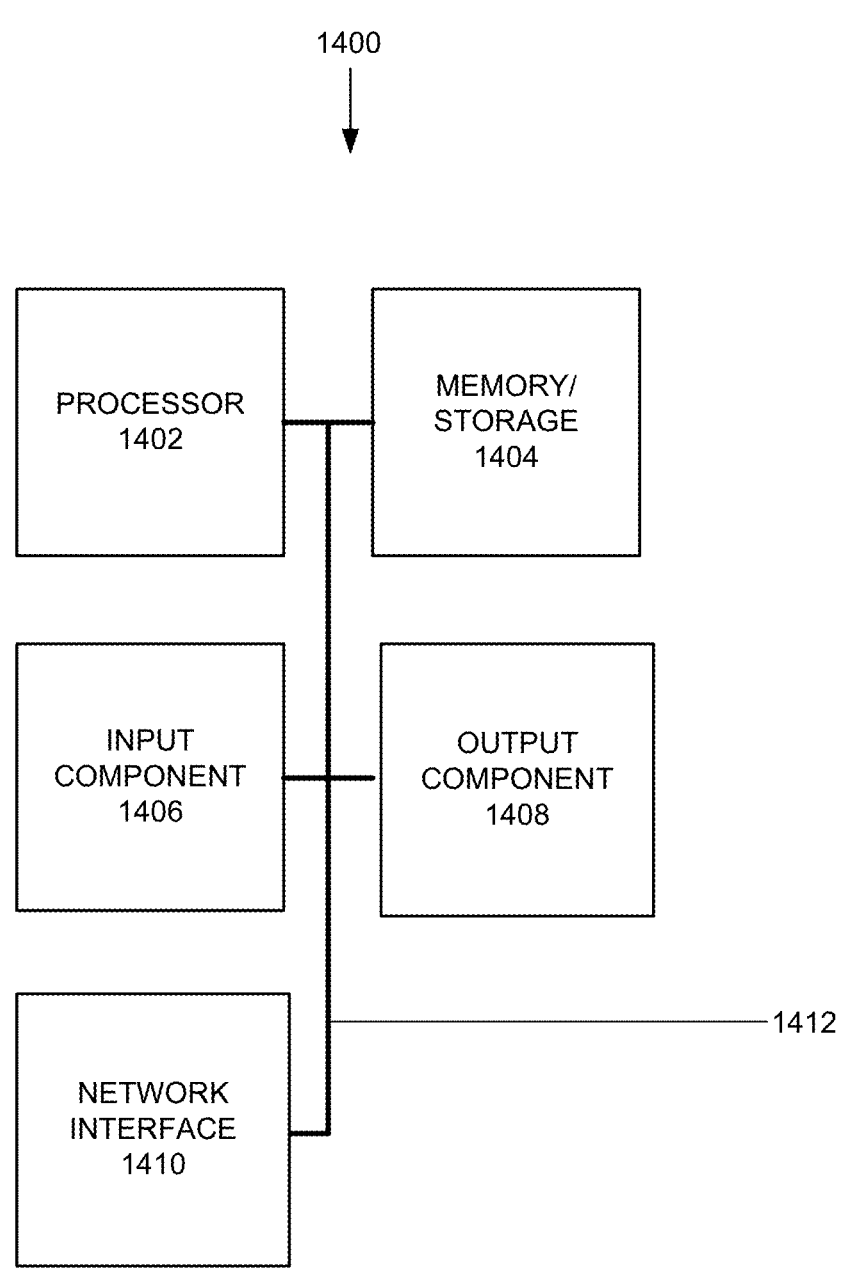
FIG. 14 is a block diagram of exemplary components of a network device according to an implementation.

FIG. 14 depicts exemplary components of an exemplary network device 1400. Network device 1400 corresponds to or is included in UE 102, access station 210, MEC devices in MEC clusters, OTA server 214, AMF 216, SMF 218, PCF 220, any of the network components of FIGS. 1, 2, 3, 7, and 11 (e.g., a router, a network switch, servers, gateways, etc.). As shown, network device 1400 includes a processor 1402, memory/storage 1404, input component 1406, output component 1408, network interface 1410, and communication path 1412. In different implementations, network device 1400 may include additional, fewer, different, or a different arrangement of components than the ones illustrated in FIG. 14.

Processor 1402 may include a processor, a microprocessor, an Application Specific Integrated Circuit (ASIC), a Field Programmable Gate Array (FPGA), a programmable logic device, a chipset, an application specific instruction-set processor (ASIP), a system-on-chip (SoC), a central processing unit (CPU) (e.g., one or multiple cores), a microcontroller, and/or another processing logic device (e.g., embedded device) capable of controlling network device 1400 and/or executing programs/instructions.

Memory/storage 1404 may include static memory, such as read only memory (ROM), and/or dynamic memory, such as random access memory (RAM), or onboard cache, for storing data and machine-readable instructions (e.g., programs, scripts, etc.).

Memory/storage 1404 may also include an optical disk, magnetic disk, solid state disk, holographic versatile disk (HVD), digital versatile disk (DVD), and/or flash memory, as well as other types of storage device (e.g., Micro-Electromechanical system (MEMS)-based storage medium) for storing data and/or machine-readable instructions (e.g., a program, script, etc.). Memory/storage 1404 may be external to and/or removable from network device 1400. Memory/storage 1404 may include, for example, a Universal Serial Bus (USB) memory stick, a dongle, a hard disk, off-line storage, a Blu-Ray® disk (BD), etc. Memory/storage 1404 may also include devices that can function both as a RAM-like component or persistent storage.

Depending on the context, the term "memory," "storage," "storage device," "storage unit," and/or "medium" may be used interchangeably. For example, a "computer-readable storage device" or "computer-readable medium" may refer to both a memory and/or storage device.

Input component 1406 and output component 1408 may provide input and output from/to a user to/from network device 1400. Input and output components 1406 and 1408 may include, for example, a display screen, a keyboard, a mouse, a speaker, actuators, sensors, gyroscope, accelerometer, a microphone, a camera, a DVD reader, Universal Serial Bus (USB) lines, and/or other types of components for obtaining, from physical events or phenomena, to and/or from signals that pertain to network device 1400.

Network interface 1410 may include a transceiver (e.g., a transmitter and a receiver) for network device 1400 to communicate with other devices and/or systems. For example, via network interface 1410, network device 1400 may communicate with wireless station 202.

Network interface 1410 may include an Ethernet interface to a LAN, and/or an interface/connection for connecting network device 1400 to other devices (e.g., a Bluetooth interface). For example, network interface 1410 may include a wireless modem for modulation and demodulation.

Communication path 1412 may enable components of network device 1400 to communicate with one another.

Network device 1400 may perform the operations described herein in response to processor 1402 executing software instructions stored in a non-transient computer-readable medium, such as memory/storage 1404. The software instructions may be read into memory/storage 1404 from another computer-readable medium or from another device via network interface 1410. The software instructions stored in memory or storage (e.g., memory/storage 1404, when executed by processor 1402, may cause processor 1402 to perform processes that are described herein. For example, UE 102, access station 210, OTA server 214, AMF 216, SMF 218, and PCF 220 may each include various programs for performing some of the above-described functions and processes.

In this specification, various preferred embodiments have been described with reference to the accompanying drawings. Modifications may be made thereto, and additional embodiments may be implemented, without departing from the broader scope of the invention as set forth in the claims that follow. The specification and drawings are accordingly to be regarded in an illustrative rather than restrictive sense.

While a series of blocks have been described above with regard to the process illustrated in FIGS. 12 and 13, the order of the blocks may be modified in other implementations. In addition, non-dependent blocks may represent blocks that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

To the extent the aforementioned embodiments collect, store, or employ personal information provided by individuals, it should be understood that such information shall be collected, stored, and used in accordance with all applicable laws concerning protection of personal information. The collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, block, or instruction used in the present application should be construed as critical or essential to the implementations described herein unless explicitly described as such. Also, as used herein, the articles "a," "an," and "the" are intended to include one or more items. Further, the phrase "based on" is intended to mean "based, at least in part, on" unless explicitly stated otherwise.

What is claimed is:

1. A device comprising:
a memory for storing User Equipment Route Selection Policy (URSP) rules, wherein each of the URSP rules specifies one or more routes, within a cellular network, based on traffic information and
a processor configured to:
receive a signal broadcast from an access station;
extract, from the signal, network slice congestion information that indicates a level of congestion at each of one or more network slices;
apply the URSP rules to the network slice congestion information to select a network slice; and
establish a session with the selected network slice.

2. The device of claim 1, wherein the memory includes one or more of:
a type of Subscriber Identity Module (SIM); or
a type of Universal Integrated Circuit Card (UICC).

3. The device of claim 1, wherein the signal includes a System Information Block.

4. The device of claim 1, wherein the network slice congestion information includes:
a Single-Network Slice Selection Assistance Information; and
a bit string indicating a congestion status.

5. The device of claim 4, wherein the congestion status indicates one of:

a normal amount of traffic at the network slice;
a moderate congestion at the network slice;
a heavy congestion at the network slice; or
a blocked state of the network slice.

6. The device of claim 1, wherein the processor is further configured to:
receive a request from an application running on the device to establish the session wherein the request specifies a plurality of parameters, and wherein when the processor applies the URSP rules, the processor is further configured to:
apply the URSP rules to the plurality of parameters to identify network slices.

7. The device of claim 6, wherein the processor is further configured to:
select, based on the network slice congestion information, the network slice among the identified network slices.

8. The device of claim 7, wherein when the processor selects the network slice, the processor is further configured to:
choose the network slice, among the network slices, which has a lowest congestion level compared to congestion levels of other network slices.

9. The device of claim 7, wherein when the processor selects the network slice, the processor is further configured to:
present a user of the device with an option that results in a selection of the network slice among the network slices;
receive input from the user in response to the presented option; and
choose the network slice, among the network slices, based in the input.

10. A method comprising:
receiving a signal broadcast from an access station;
extracting, from the signal, network slice congestion information that indicates a level of congestion at each of one or more network slices;
applying User Equipment Route Selection Policy (URSP) rules to the network slice congestion information to select a network slice, wherein each of the URSP rules specifies one or more routes, within a cellular network, based on traffic information; and
establishing a session with the selected network slice.

11. The method of claim 10, wherein the URSP rules are stored in a device comprising:
a type of Subscriber Identity Module (SIM); or
a type of Universal Integrated Circuit Card (UICC).

12. The method of claim 10, wherein the signal includes a System Information Block.

13. The method of claim 10, wherein the network slice congestion information includes:
a Single-Network Slice Selection Assistance Information; and
a bit string indicating a congestion status.

14. The method of claim 13, wherein the congestion status indicates one of:
a normal amount of traffic at the network slice;
a moderate congestion at the network slice;
a heavy congestion at the network slice; or
a blocked state of the network slice.

15. The method of claim 10, further comprising:
receiving a request from an application running on a device to establish the session, wherein the request specifies a plurality of parameters, and wherein applying the URSP rules comprises:

applying the URSP rules to the plurality of parameters to identify network slices.

16. The method of claim 15, further comprising:

selecting, based on the network slice congestion information, the network slice among the identified network slices.

17. The method claim 16, wherein selecting the network slice comprises:

choosing the network slice, among the network slices, which has a lowest congestion level compared to congestion levels of other network slices.

18. The method of claim 16, wherein selecting the network slice comprises:

presenting a user of the device with an option that results in a selection of the network slice among the network slices;

receiving input from the user in response to the presented option; and choosing the network slice, among the network slices, based in the input.

19. A non-transitory computer-readable medium comprising processor-executable instructions, which when executed by a processor in a device, cause the processor to:

receive a signal broadcast from an access station;

extract, from the signal, network slice congestion information that indicates a level of congestion at each of one or more network slices;

apply User Equipment Route Selection Policy (URSP) rules to the network slice congestion information to select a network slice, wherein each of the URSP rules specifies one or more routes, within a cellular network, based on traffic information; and establish a session with the selected network slice.

20. The non-transitory computer-readable medium of claim 19, wherein the URSP rules are stored in a device comprising:

a type of Subscriber Identity Module (SIM); or a type of Universal Integrated Circuit Card (UICC).

* * * * *